United States Patent
Arriaran Ugarte et al.

(10) Patent No.: US 10,106,341 B2
(45) Date of Patent: Oct. 23, 2018

(54) METHOD AND APPARATUS FOR PALLETIZING LOADS

(71) Applicant: ULMA MANUTENCIÓN, S.COOP., Oñati (ES)

(72) Inventors: Roberto Arriaran Ugarte, Oñati (ES); Iker Ballarin Zufiaurre, Oñati (ES); Eneko Ugalde Iriondo, Oñati (ES)

(73) Assignee: ULMA MANUTENCION, S.COOP., Onati (ES)

( * ) Notice: Subject to any disclaimer, the term of this patent is extended or adjusted under 35 U.S.C. 154(b) by 396 days.

(21) Appl. No.: 14/764,870

(22) PCT Filed: Jan. 16, 2014

(86) PCT No.: PCT/EP2014/050833
§ 371 (c)(1),
(2) Date: Jul. 30, 2015

(87) PCT Pub. No.: WO2014/118014
PCT Pub. Date: Aug. 7, 2014

(65) Prior Publication Data
US 2015/0360885 A1  Dec. 17, 2015

(30) Foreign Application Priority Data

Jan. 30, 2013   (EP) .................................. 13382028

(51) Int. Cl.
*B65G 65/08*  (2006.01)
*B65G 47/08*  (2006.01)
(Continued)

(52) U.S. Cl.
CPC ............. *B65G 65/08* (2013.01); *B65G 15/28* (2013.01); *B65G 47/086* (2013.01); *B65G 47/22* (2013.01);
(Continued)

(58) Field of Classification Search
CPC .... B65G 47/22; B65G 47/34; B65G 2205/04; B65G 2811/06; B65G 65/08; B65G 15/28;
(Continued)

(56) References Cited

U.S. PATENT DOCUMENTS 8,074,431 B1   12/2011  Pierson
9,126,770 B1*  9/2015  Widder .................. B65G 57/02
(Continued)

FOREIGN PATENT DOCUMENTS

DE   69418438 T2   12/1992
EP   1462394 A2    9/2004
(Continued)

OTHER PUBLICATIONS

International Search Report and Written Opinion for International Application No. PCT/EP2014/050833; prepared by the European Patent Office, dated May 6, 2014, 10 pages, Rijswijk, NL.
(Continued)

*Primary Examiner* — Saul Rodriguez
*Assistant Examiner* — Ashley K Romano
(74) *Attorney, Agent, or Firm* — Edell, Shapiro & Finnan, LLC (57) ABSTRACT

Multi-reference palletizing device comprising first displacement means (11) for moving a load (2) in a direction transverse to a pallet (6) and second displacement means (12) for moving the load (2) in a direction longitudinal to the depth of the pallet (6), comprising a surface (50) on which the load (2) rests, the surface (50) being movable in the longitudinal direction (6). The first displacement means (11) comprise a surface (40) on which the load (2) rests, movable in the transverse direction and suitable for positioning the load (2) in a final transverse position. It further comprises fastening means (20, 21) for fastening the load (2) to
(Continued)

stabilize the load (2) during the movement thereof from the final transverse position to the final position in the longitudinal direction. The fastening means (20, 21) comprise members configured to laterally fasten the load (2).

9 Claims, 6 Drawing Sheets

(51) Int. Cl.
  *B65G 61/00* (2006.01)
  *B65G 15/28* (2006.01)
  *B65G 47/22* (2006.01)
  *B65G 47/34* (2006.01)
  *B65G 47/91* (2006.01)

(52) U.S. Cl.
  CPC ............ *B65G 47/34* (2013.01); *B65G 47/91* (2013.01); *B65G 61/00* (2013.01); *B65G 2201/025* (2013.01); *B65G 2205/04* (2013.01); *B65G 2811/06* (2013.01); *B65G 2812/02128* (2013.01)

(58) Field of Classification Search
  CPC ...... B65G 47/086; B65G 47/91; B65G 61/00; B65G 2201/025; B65G 2812/02128
  See application file for complete search history.

(56) References Cited

U.S. PATENT DOCUMENTS

| | | | |
|---|---|---|---|
| 2005/0063815 A1* | 3/2005 | Pierson | B65G 57/24 414/799 |
| 2014/0346011 A1* | 11/2014 | Gaillard | B65G 23/26 198/426 |
| 2015/0360885 A1* | 12/2015 | Arriaran Ugarte | B65G 47/086 414/799 |

FOREIGN PATENT DOCUMENTS

| | | |
|---|---|---|
| EP | 1864923 A1 | 12/2007 |
| EP | 2163498 A1 | 3/2010 |
| JP | H11199053 | 7/1999 |
| WO | 2009094681 A1 | 8/2009 |
| WO | 2011009150 A1 | 1/2011 |

OTHER PUBLICATIONS

European Search Report for European Application No. EP13382028, prepared by the European Patent Office, dated Jun. 25, 2013, 3 pages, The Hague.

Opposition documents for EP2692668B1.

* cited by examiner

METHOD AND APPARATUS FOR PALLETIZING LOADS

CROSS-REFERENCE TO RELATED APPLICATIONS

This application relates to and claims the benefit and priority to International Application No. PCT/EP2014/050833, filed Jan. 16, 2014, which claims the benefit and priority to European Patent Application No. 13382028.2, filed Jan. 20, 2013.

TECHNICAL FIELD

The present invention is related to a palletizing device suitable for palletizing loads on a pallet, particularly multi-reference loads, i.e., loads of different types. The present invention is further related to an operating method for operating the palletizing device.

BACKGROUND

Palletizing devices suitable for automatically palletizing single-reference or multi-reference loads on a pallet are known. Palletizing devices including an articulated robot that deposits each load on the pallet are also known. In addition to taking up a great deal of space, they are not suitable for transferring all types of load.

EP1462394A2 describes a palletizing device comprising a lifting device for lifting the pallet and handling and support means suitable for depositing the load on the pallet in a specific position. The handling means comprises a fixed platform on which the load moves pushed by a pushing element until depositing it on a plate. The plate is suitable for fastening the load and moving it towards the depth of the pallet, another element retaining the load on the pallet in the desired position. The plate is retracted to position the load in the desired position.

A problem associated with known palletizing devices is the difficulty in palletizing multi-reference pallets where the loads do not have similar regular geometries or they are unstable and/or deformable loads. In said cases, it is difficult to obtain precise positioning of the loads on the pallet which leads to obtaining stable pallets.

SUMMARY OF THE DISCLOSURE

According to one embodiment a palletizing device is provided that comprises positioning means suitable for positioning at least one load in a final position on the pallet. The positioning means comprises first displacement means for moving said at least one load in a direction transverse to the depth of the pallet and second displacement means for moving the load in a direction longitudinal to the depth of the pallet.

The first displacement means comprise at least one surface on which the load or loads are supported in a stable manner, said surface being movable in the direction transverse to the depth of the pallet for positioning the load or loads in the final transverse position. The load or loads therefore move in a stable manner to the final transverse position.

The second displacement means for moving the load comprises at least one surface, less than the width of the pallet, on which the load or loads are supported, the surface being movable in the direction longitudinal to the depth of the pallet. To prevent the load or loads from falling or from moving with respect to the final transverse position, particularly when the load or loads have an irregular geometry, the palletizing device comprises fastening means for fastening the load or loads configured to stabilize the load during the movement thereof from the final transverse position to the final position on the pallet. The fastening means comprises a first member and a second member configured to laterally fasten the load or loads between both members, the load or loads moving together with the fastening means during the movement of the second displacement means. Once the load is positioned in the final position on the pallet, the surface of the second displacement means is retracted until releasing the load, the load being deposited on the pallet. Finally, the fastening means is removed from the load.

Stable and precise movement of the load along the entire path until it is positioned and deposited on the pallet is therefore obtained regardless of if the load has an irregular geometry, is an unstable load or has a deformable geometry. The palletizing device further allows palletizing several loads simultaneously.

These and other advantages and features of the will become evident in view of the drawings and the detailed description.

DETAILED DESCRIPTION

FIGS. 1 to 4 show an embodiment of a palletizing device 1 suitable for palletizing multi-reference loads on a pallet 6. The palletizing device 1 comprises positioning means 10 configured to position a load 2 in a final position on the pallet 6. The positioning means 10 comprises first displacement means 11 for moving the load 2 in a direction transverse to the depth of the pallet 6 (direction X) and second displacement means 12 for moving the load in a direction longitudinal to the depth of the pallet 6 (direction Y).

The first positioning means 11 comprises at least one surface 40 on which the load 2 is supported, the surface 40 being movable in the direction transverse to the pallet 6, the surface 40 being suitable for positioning said at least one load 2 in a final transverse position.

The second positioning means 12 comprises at least one surface 50 on which the load 2 is supported, the surface being movable in the direction longitudinal to the depth of the pallet 6.

Figure 6:
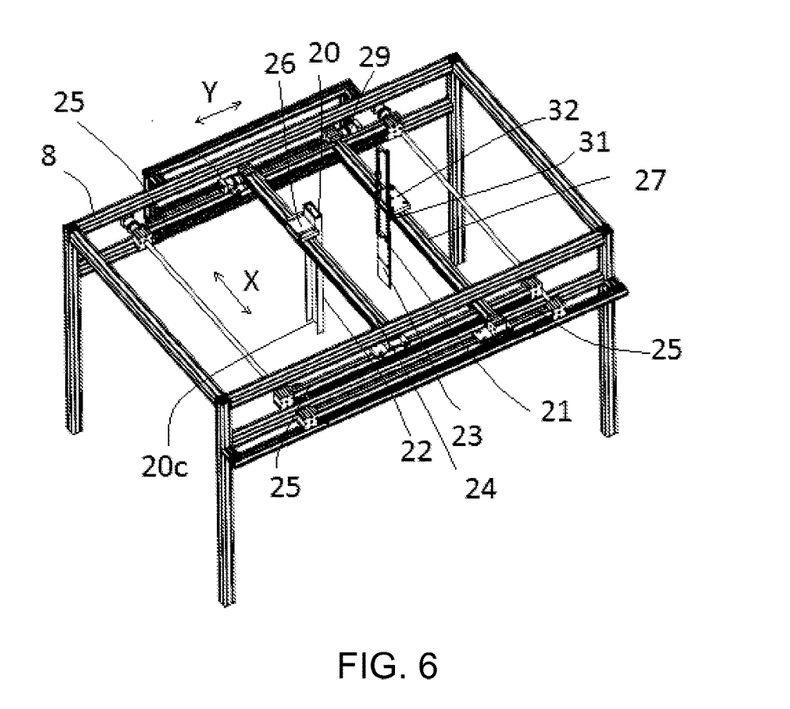
FIG. 6 shows a perspective view of the fastening means comprised in the palletizing device shown in FIG. 1.
Figure 7:
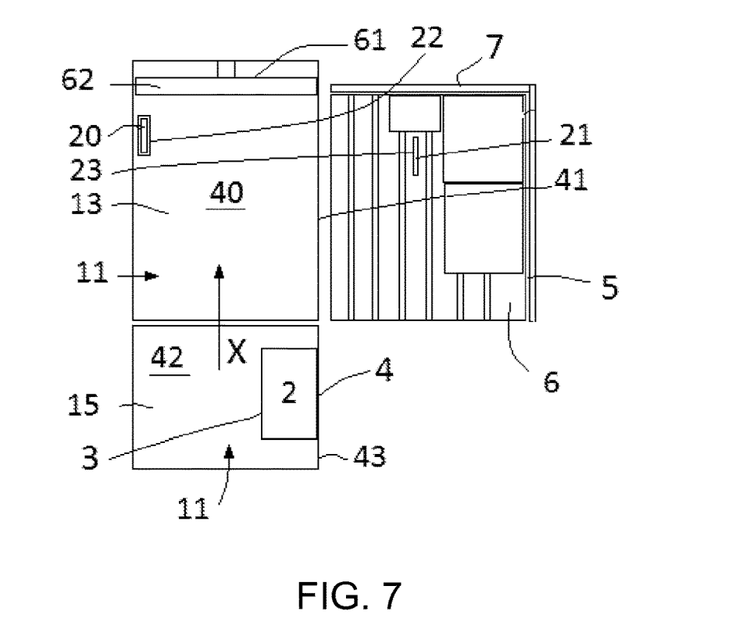
FIG. 7 shows a schematic plan view of the displacement means for moving the load of the palletizing device shown in FIG. 1 in the zero position.
Figure 8:
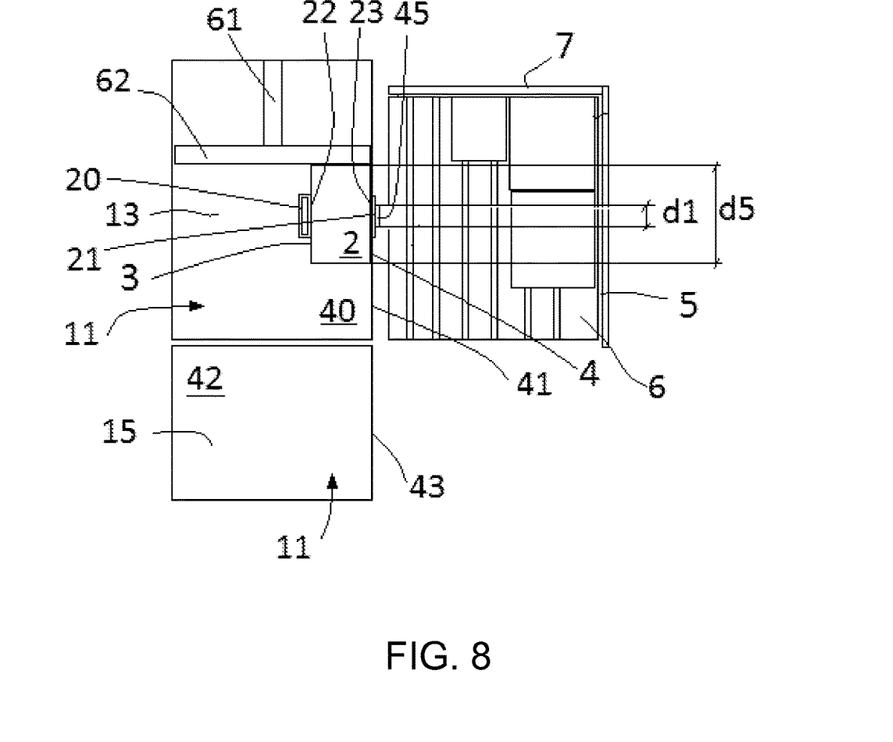
FIG. 8 shows a schematic plan view of the displacement means for moving the load of the palletizing device shown in FIG. 1 in the first position.
Figure 9:
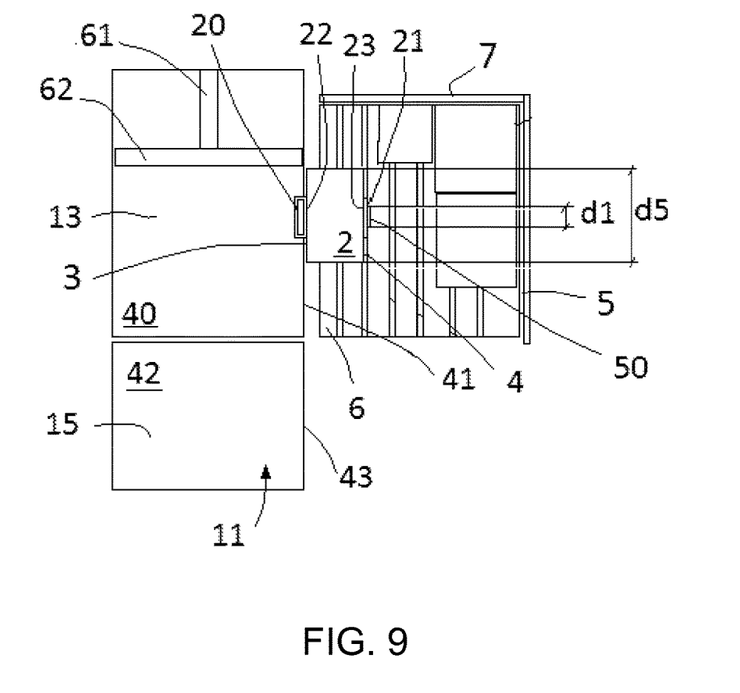
FIG. 9 shows a schematic plan view of the displacement means for moving the load of the palletizing device shown in FIG. 1 in the second position.

The palletizing device 1 further comprises fastening means 20 and 21, shown in detail in FIG. 6, fastening the load 2 during the movement of the load 2 from the final transverse position to the final position in the longitudinal direction of the pallet 6. As a result of the fastening means 20 and 21 regardless of the type of load, said load moves in a stable and precise manner from the final transverse position to the final position in which the load 2 is deposited on the pallet 6. The fastening means 20 and 21 do not cooperate in the movement of the load 2 except in the transition of the load 2 from the surface 40 of the first displacement means 11 to the surface 50 of the second displacement means 12. Once the load 2 is positioned on the surface 50 of the second displacement means 12 the load 2 moves together with the surface 50 without involving the fastening means 20 and 21.

In the embodiment shown in FIGS. 1 to 4, the first positioning means 11 comprise a conveyor belt 13. The main conveyor belt 13 comprises a continuous band moving between two drums (not depicted in the drawings), the band being the movable surface 40 on which the load 2 rests.

Figure 1:
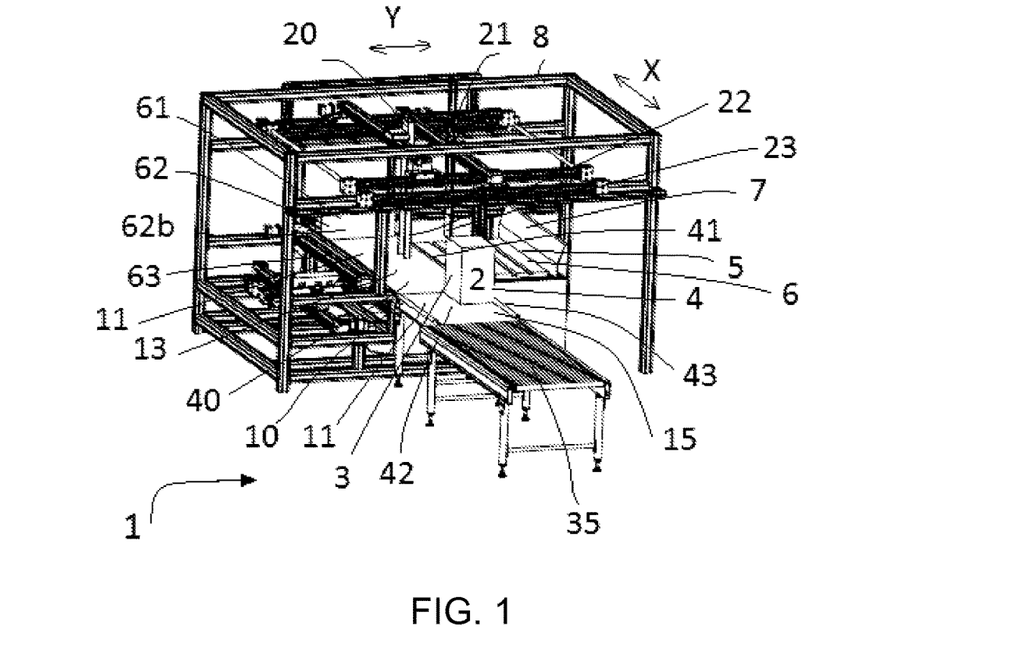
FIG. 1 shows a perspective view of an embodiment of a palletizing device in a zero position.
Figure 2:
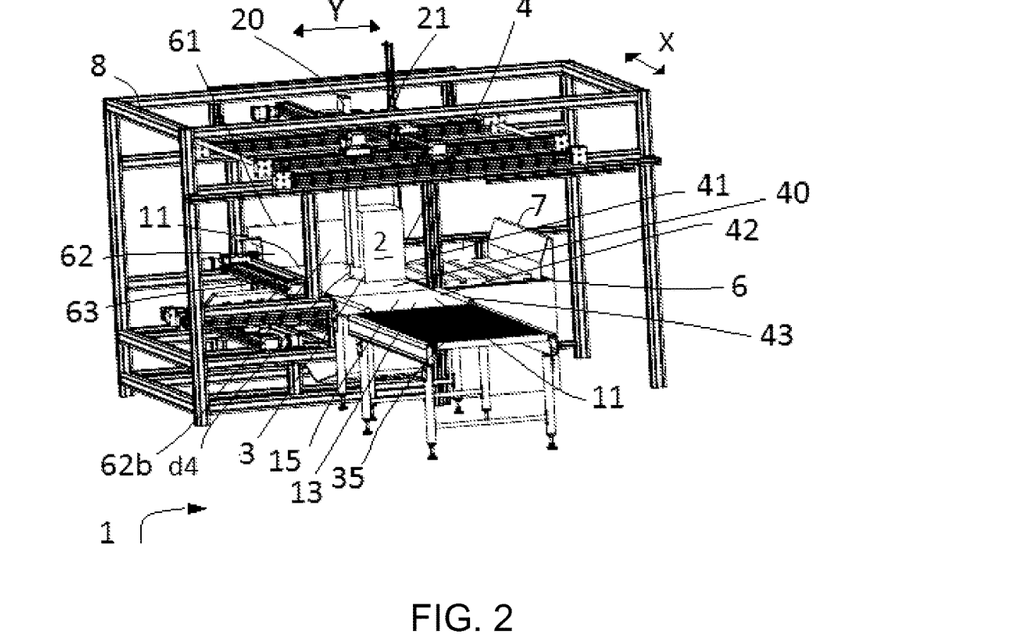
FIG. 2 shows another perspective view of the palletizing device shown in FIG. 1 in a first position.
Figure 3:
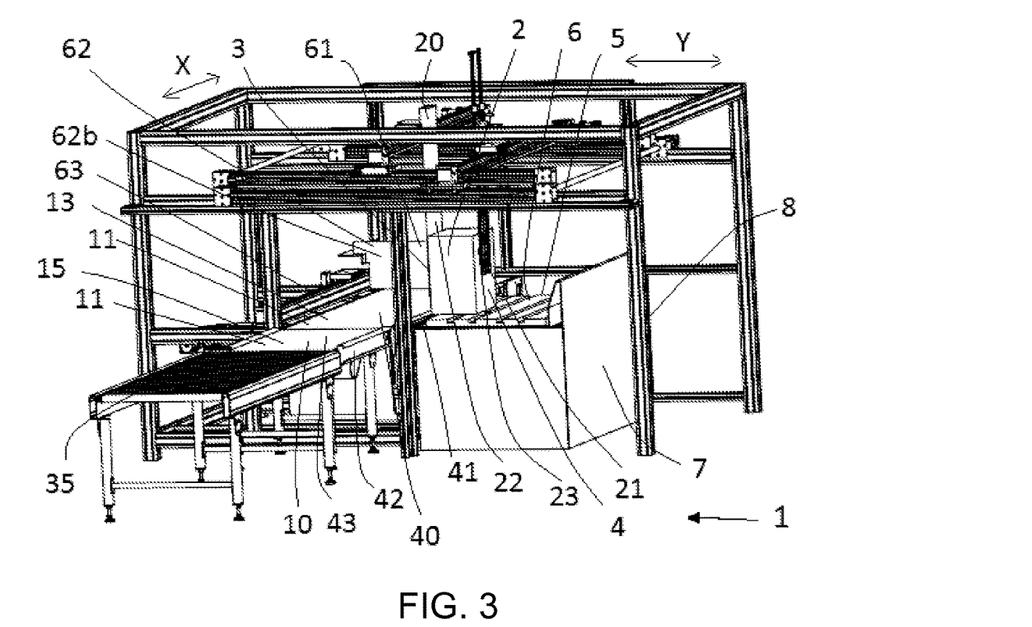
FIG. 3 shows another perspective view of the palletizing device shown in FIG. 1 in a second position.
Figure 4:
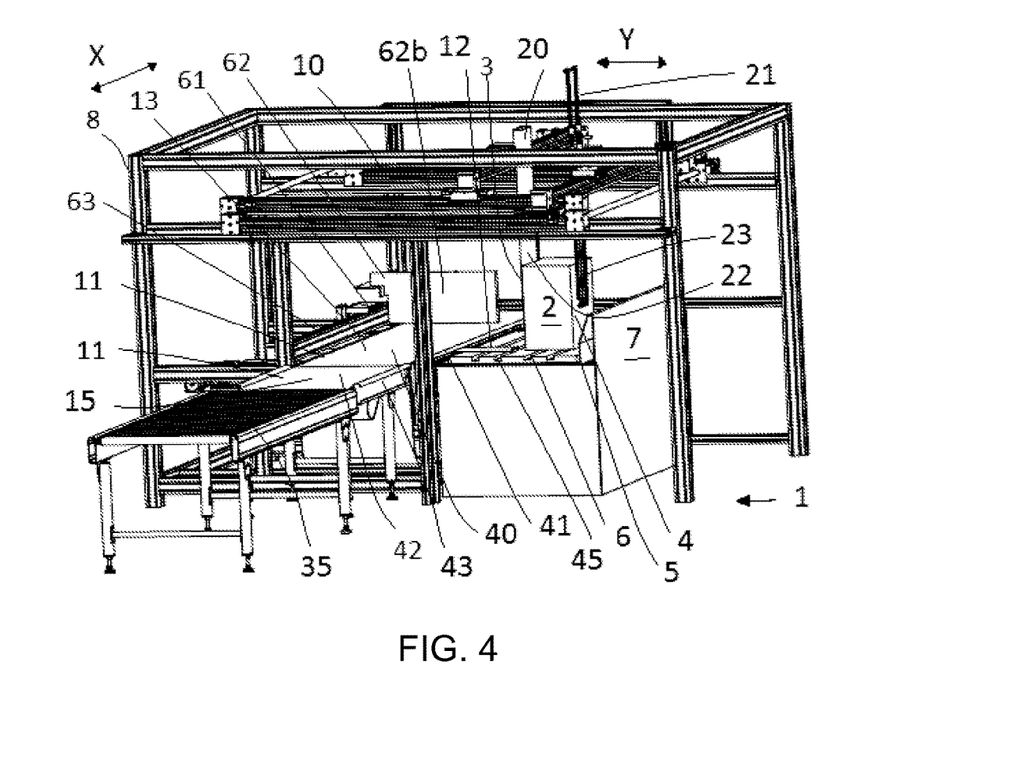
FIG. 4 shows another perspective view of the palletizing device shown in FIG. 1 in a final position.

The palletizing device 1 is fed continuously by feeding means 35 shown partially in FIG. 1. The feeding means 35 is aligned with the first positioning means 11 such that the loads move in the same direction (direction X). Details of the feeding means 35 are not included in the description given that they are known in the state of the art.

The load 2 is positioned previously by the feeding means 35 such that when the load 2 reaches the conveyor belt 13, it is arranged at one end of the band 40. The load 2 is substantially aligned with an edge 41 of the band 40 facing the pallet 6, such that the load 2 moves along the conveyor belt 13 substantially aligned with the edge 41.

In the embodiment shown in FIGS. 1 to 4, the first positioning means 11 comprise an additional conveyor belt 15.

The additional conveyor belt 15 is arranged before the conveyor belt 13, i.e., the feed system 35 drives the loads to the additional conveyor belt 15 (hereinafter referred to as first conveyor belt 15), which in turn drives them to the conveyor belt 13 (hereinafter referred to as second conveyor belt 13).

In the embodiment shown, both conveyor belts 13 and 15 have substantially the same width. The load 2 is supported entirely on said conveyor belts 13 and 15, i.e., the surface on which the load 2 could rest is smaller than the surface 40. Furthermore, both conveyor belts 13 and 15 are laterally aligned; they are particularly aligned with respect to the edge 41 and 43 of the respective band 40 and 42 facing the pallet 6. The load 2 therefore moves along both conveyor belts 13 and 15 substantially aligned with the respective edge 41 and 43 to the final transverse position, shown in FIG. 4.

In the embodiment shown in FIGS. 1 to 4, the second conveyor belt 13 is of the modular type, i.e., the band 40 is modular, to minimize the wear and prevent off-centering of the load 2 in the direction Y. In turn, the first conveyor belt 15 is a conventional band 42 made of PVC plastic, rubber or other materials.

The palletizing device 1 comprises control means (not depicted in the drawings) which are fed with set points relating to each load 2 that will be palletized. Said set points provide information about the acceleration that each load 2 must have as well as about the final transverse position and the final position the load 2 has on the pallet 6. Taking into account the different typology of loads that can be packaged on a pallet 6, for example fragile loads, loads with irregular geometries meaning that they may have unstable support points, or deformable loads, it is important to know beforehand the acceleration at which they can be moved so that said movement is stable and their final positioning is correct.

The control means controls the acceleration/deceleration of the conveyor belts 13 and 15. When the load 2 enters the first conveyor belt 15, both conveyor belts 13 and 15 act like a single conveyor belt the band of which moves at a specific acceleration. So when the load 2 enters the second conveyor belt 13, it continues with the same previous acceleration and subsequently decelerates until the band 40, and therefore the load 2, stops. The second conveyor belt 13 decelerates independently of the first conveyor belt 15. Since there are two conveyor belts 13 and 15 which can be controlled independently, loads flow continuously during the palletizing process given that while the load 2 is fastened by the fastening means 20 and 21 and moved from the second conveyor belt 15 towards at least one arm 45 of the second positioning means 12, the next load enters the first conveyor belt 15.

The control means comprise a servo (not depicted in the drawings) which is arranged on the second conveyor belt 13 and measures the position of the band 40 at all times. When the position measured by the servo coincides with the final transverse position set point, the control means acts on the band 40, stopping it.

In other alternatives, the control means can comprise another type of sensors, encoders or other devices that determine the position of the band 40 at all times.

In other embodiments, the palletizing device 1 can comprise a single conveyor belt.

In the embodiment shown in the drawings, the palletizing device 1 further comprises stopping means 61, shown in FIGS. 1 to 4 and schematically shown in FIGS. 7 to 10, which assure the stable stopping of the load 2 in the final transverse position. The stopping means 61 acts as securing means, stabilizing the load 2 in the specific position in the event that the stopping by means of the servo is not precise and/or due to the typology of the load 2 said stopping is not carried out correctly. The stopping means 61 comprises a stop element 62 including a substantially planar contact surface 62b suitable for contacting the load 2. The contact surface 62b is arranged substantially orthogonal to the forward movement direction (direction X) of the second conveyor belt 13, said stop element 62 being movable in the forward movement direction of the second conveyor belt 13. The stop element 62 moves along a guide 63, arranged substantially parallel to the forward movement direction of the second conveyor belt 13, operated by an electric motor not depicted in the drawings. The stop element 62 moves in the direction opposite the forward movement direction to enable stopping the load 2 in the final transverse position in a stable manner.

Figure 5:
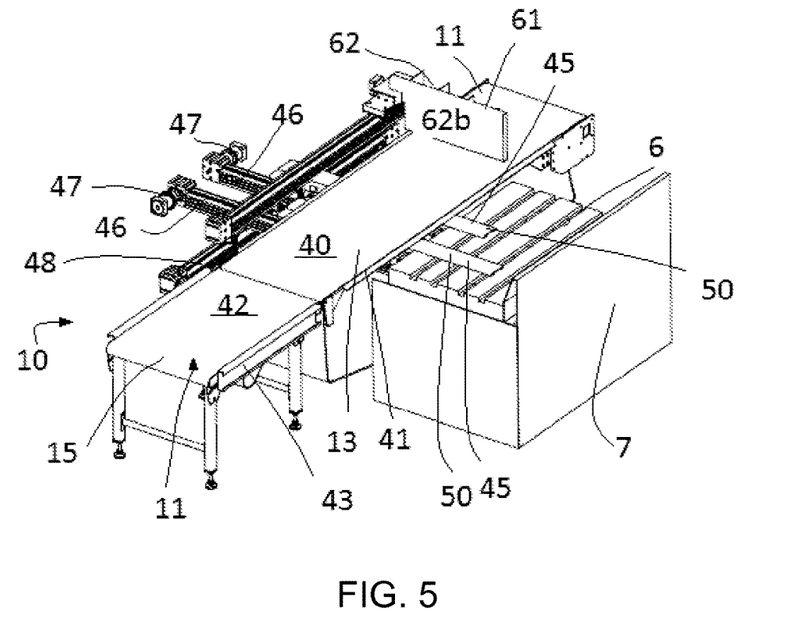
FIG. 5 shows another perspective view of the displacement means for moving the load comprised in the palletizing device shown in FIG. 1.

On the other hand, the second positioning means 12, shown in detail in FIG. 5, comprise arms 45 extending from the second conveyor belt 13 in the longitudinal depth direction of the pallet 6.

Each arm 45 comprises a surface 50 on which the load 2 is supported, the arm 45 being movable in the direction longitudinal to the depth of the pallet 6. The surface 50 is substantially planar. Furthermore, except in the case of small loads, the arm 45 has a width d1 that is less than the width d2 of the supportable surface of the load 2, the supportable surface being the surface on which the load could rest, shown in FIGS. 8 and 9. The width d1 of the arm 45 is less than the width of the pallet 6.

In the embodiment shown in the drawings, the second positioning means 12 comprise two substantially parallel arms 45 extending from the second conveyor belt 13. Said arms 45 are used when more than one load at a time moves or when the load to move is too large with respect to the width d1 of the arm 45.

The second positioning means 12 further comprise longitudinal carriages 46 arranged substantially parallel to one another in the longitudinal depth direction, along each of which the corresponding arm 45 operated by a corresponding motor 47 can move. The movement of the arms 45 with respect to the respective longitudinal carriages 46 can be synchronized or they can move independently as needed. On the other hand, the longitudinal carriages 46 are supported in a transverse carriage 48 supported in the support structure 8 of the palletizing device 1, each longitudinal carriage 46 being able to move along said transverse carriage 48 operated by a corresponding motor 47. It is therefore possible to adjust the distance between arms 45 in the event that both arms 45 are necessary for moving the load 2.

In parallel with the first displacement means 11 moving the load 2 to the final transverse position, the arm 45 moves by means of the transverse carriage 48 and the longitudinal carriages 46 until being positioned in a manner that is substantially centered with respect to the load 2 in the final transverse position. In the event that the load 2 requires two arms 45, said arms 45 will be positioned balancing the weight thereof.

Figure 10:
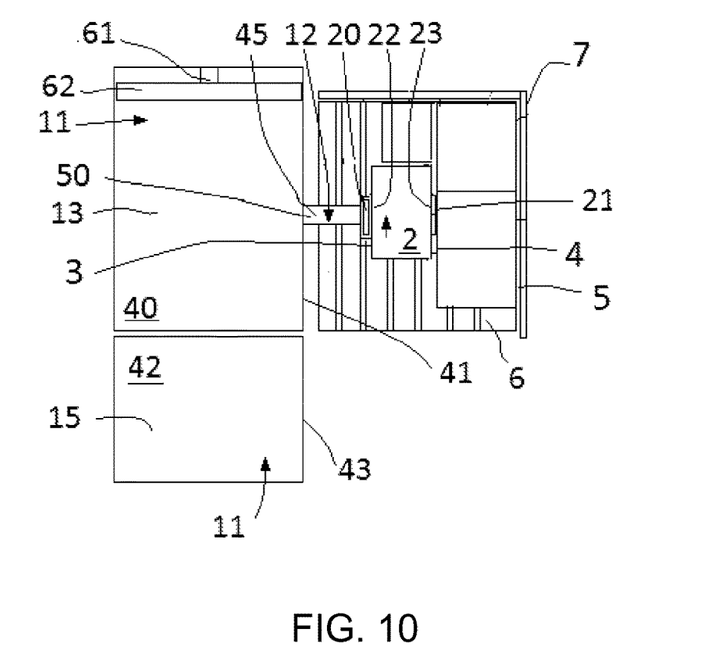
FIG. 10 shows a schematic plan view of the displacement means for moving the load of the palletizing device shown in FIG. 1 in a third position.
Figure 11:
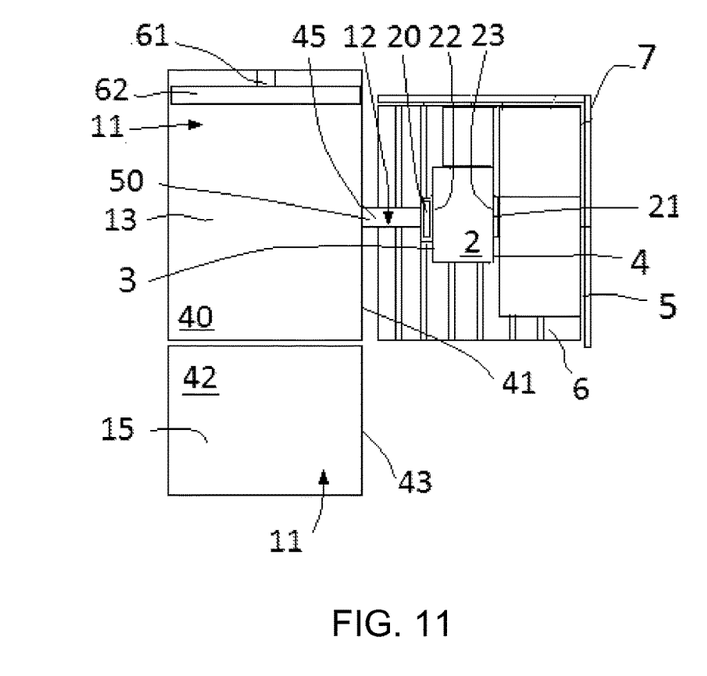
FIG. 11 shows a schematic plan view of the displacement means for moving the load of the palletizing device shown in FIG. 1 in a fourth position.
Figure 12:
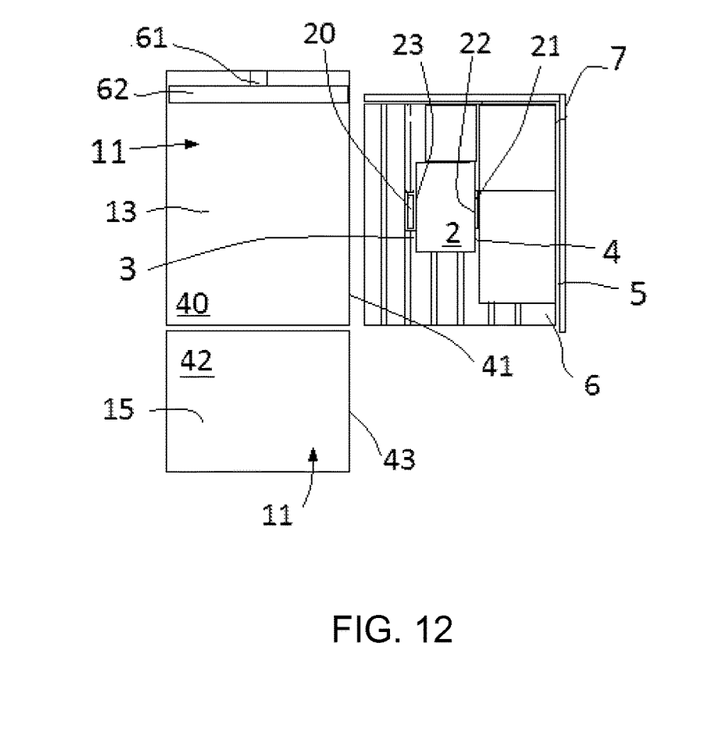
FIG. 12 shows a schematic plan view of the displacement means for moving the load of the palletizing device shown in FIG. 1 in the final position.

On the other hand, once the load 2 is located in a final longitudinal position on the pallet 6, shown in FIG. 10, the arm 45 moves together with the load 2 and the fastening means 20 and 21 transversely from the final longitudinal position, shown in FIG. 10, to the final position of the load, shown in FIGS. 11 and 12, in which the load 2 is in contact with the previously deposited load, therefore preventing the load 2 to be depositing from hitting against the previously deposited load either because said previously deposited load may have moved from its theoretical position or because of shape defects, among other reasons.

On the other hand, the fastening means 20 and 21, shown in detail in FIG. 6, comprise a first member 20 and a second member 21 configured to laterally fasten the load 2, a stable, secure and precise movement of the load 2 being obtained.

The first member 20 comprises a substantially planar fastening surface 22. The second member 21 in turn comprises a substantially planar fastening surface 23, both fastening surfaces 22 and 23 being arranged substantially parallel to and facing one another in the position shown in FIG. 3, in which the second conveyor belt 13 has stopped, positioning the load 2 in the final transverse position.

The first member 20 and the second member 21 are arranged substantially orthogonal to the longitudinal depth direction such that the fastening surface 22 of the first member 20 rests against a first side surface 3 of the load 2, whereas the fastening surface 23 of the second member 21 is supported against a second side surface 4 of the load 2, the second side surface 4 of the load 2 corresponding with the surface of the load 2 which is substantially aligned with the edge 41 of the band 40 of the second conveyor belt 13.

On the other hand, the first member 20 is supported in a transverse carriage 24, being able to move along said transverse carriage 24, operated by a motor 26. In turn, the transverse carriage 24 is supported in longitudinal carriages 25 such that the transverse carriage 24 together with the first member 20 can move in the longitudinal depth direction, operated by a motor. Therefore, the control means of the palletizing device 1 can transfer the first element 20 from the zero position, shown in FIG. 1 and FIG. 7, in the transverse direction and in the longitudinal depth direction, until correctly positioning it in the position in which the load 2 is located, shown in FIGS. 2 and 8.

The first member 20 has a substantially rectangular section, although in other embodiments it could have a different geometry, the fastening surface 22 remaining substantially planar. The first member 20 vertically extends continuously from the transverse carriage 24, being located at a distance d4 from the band 40 of the second conveyor belt 13. In the embodiment shown in the drawings, said distance d4 is minimal, said distance d4 being the minimum distance necessary to prevent friction between the first element 20 and the band 40 and assuring that the fastening of the first element 20 to the load 2 is carried out along most of the first side surface 3 of the load 2.

In parallel, the second member 21 is supported in a transverse carriage 27. In turn, the transverse carriage 27 is supported in the previous longitudinal carriages 25, being able to move in the longitudinal depth direction operated by a motor 29. The second member 21 is vertically movable from the zero position to the fastening position in which the second member 21 is arranged in an extended position. To that end, the second member 21 comprises guides or slides 31 along which said second member 21 moves, the second member 21 being operated by a corresponding motor 32. The control means of the palletizing device 1 can therefore transfer the second element 21 from the zero position in the transverse direction and in the longitudinal depth direction until positioning it opposite the load 2, supported on the second support surface 4 of the load 2.

On the other hand, in other alternatives not shown in the drawings, the first member 20 can comprise suction means arranged on a surface 20c facing the band 40. Said suction means are configured to fasten to the band 40 those loads having a height that is less than the distance d4 of the first member 20 by suction means. The load therefore moves together with the first member 20 in the longitudinal depth direction to the desired position on the pallet 6. The described suction means are suitable for moving loads such as pieces of cardboard which are arranged on the pallet to separate different layers of loads on the pallet 6, particularly when said loads are unstable or have irregular geometries.

Once the load 2 is positioned by the second conveyor belt 13 in the final transverse position, the first member 20 and the second member 21 are positioned by laterally fastening the load 2. The first member 20 pushes said load 2 from said position shown in FIG. 2 until the load 2 is deposited on the respective arm 45, while at the same time it fastens it together with the second member 21. Once the load 2 is deposited on the arm 45, both members 20 and 21 only laterally fasten the load 2, whereas the arm 45 moves the load 2 in the longitudinal depth direction to the final position.

The members 20 and 21 are movable independently from one another until they are positioned for fastening the load 2. From the time the members 20 and 21 fasten the load 2 in the final transverse position, shown in FIGS. 2, 8 and 9, to the final position shown in FIGS. 3, 11 and 12, the movement of both members 20 and 21 is synchronous with one another and with the movement of the arm 45.

When the load 2 reaches the final longitudinal position, shown in FIG. 10, the arm 45 moves transversely with respect to the depth of the pallet 6 together with the load 2 and the fastening means 20 and 21 to the final position, shown in FIGS. 11 and 12, in which the load 2 is in contact with the previously deposited load.

The arm 45 supporting the load 2 is subsequently retracted, the load 2 being deposited on the pallet 6, whereas the members 20 and 21 continue to laterally fasten the load 2. Once the arm 45 has been completely retracted with respect to the load 2, the members 20 and 21 are separated from the load 2, returning to the zero position, shown in FIGS. 2 and 7.

The palletizing device 1 comprises a housing 5 in which the pallet 6 is housed. Said housing 5 is delimited by walls 6 that keep the loads correctly positioned on the pallet 6 while the pallet 6 is gradually being configured. Furthermore, as the configured pallet 6 vertically descends, exiting the housing 5 in a guided manner, it is automatically baled, whereby a stable, formed pallet is obtained. Having to use pallets with sides walls integrated in said pallet for the same purpose of stabilizing the final pallet is therefore prevented.

The palletizing device 1 further comprises non-depicted vertical displacement means configured to vertically move the pallet 6 in the housing 5 according to the predetermined position that the load 2 that will be deposited on said pallet 6 requires. The vertical displacement means are known in the state of the art; they act on the pallet 6 by vertically moving it to substantially align the arm 45 with the support surface on which the corresponding load 2 will be supported on the pallet 6. Therefore, prior to the final positioning of the load 2, the pallet 6 is positioned vertically with respect to the surface 50 of the arm 45, such that the arm 45 is arranged at a minimum distance with respect to the support surface on which the load 2 will be supported, preventing friction with respect to said support surface.

On the other hand, in other alternatives not shown in the drawings, instead of vertically moving along the guides or belts 31, the second member 21 can include mechanisms of another type, such as collapsible mechanisms which collapse said second member 21, particularly the fastening surface 23 of the second member 21. Furthermore, there can be loads which, due to their geometry or typology, do not require the second member 21, being fastened only be the first member 20. In said cases, the second member 21 would remain in the standby position.

On the other hand, in other alternatives not shown in the drawings, the first member 20 is furthermore vertically movable. To that end it comprises guides or belts operated by a motor or mechanisms of another type that allow the vertical movement thereof.

Finally, the load can be any type of load regardless of the geometry and typology thereof. Furthermore, the palletizing device is fed continuously with loads, being suitable for simultaneously positioning one or more loads on the pallet 6.

The invention claimed is:

1. A method for individually positioning each of a plurality of loads in a final position on a pallet having a length and depth, the positioning including a placement of a first load on the pallet within a lengthwise row of one or more loads previously positioned on the pallet, the method comprising:
   positioning the first load on a first surface of a first displacement assembly, the first surface moveable in a direction transverse to the depth of the pallet,
   moving the first surface to position the first load at a final transverse position,
   fastening the first load between first and second members of a fastening assembly,
   with the first load fastened between the first and second members, transferring the first load at the final transverse position to a second surface of a second displacement assembly by pushing the first load with the first member to cause the first load to slide from the final transverse position on the first surface of the first displacement assembly onto the second surface of the second displacement assembly at a transverse position corresponding to the final transverse position, the second surface moveable in a direction longitudinal to the depth of the pallet,
   moving the second surface in the direction longitudinal to the depth of the pallet to position the first load in the final position in the lengthwise row of the pallet while the first load is fastened between the first and second members of the fastening assembly,
   retracting the second surface to release the first load onto the pallet at the final position; and
   releasing the first load from between the first and second members of the fastening assembly after retracting the second surface to release the first load onto the pallet.

2. The method according to claim 1, wherein the first load is positioned on the first surface so that a side surface of the first load that faces the pallet is aligned with an edge of the first surface that faces the pallet.

3. The method according to claim 1, wherein at least the first member of the fastening assembly moves the first load from the first surface to the second surface.

4. The method according to claim 1, wherein the second surface is supported by a structure having a bottom surface opposite the second surface, the bottom surface being maintained a distance above a top surface of the pallet prior to the final positioning of the first load.

5. The method according to claim 4, wherein the pallet is moved vertically so that the top surface of the pallet contacts the bottom surface prior to retracting the second surface to release the first load onto the pallet at the final position.

6. The method according to claim 1, wherein the final position of the first load on the pallet places the load in contact with a previously deposited second load.

7. The method according to claim 1, wherein the first member of the fastening assembly is supported and moveable in a first transverse carriage that is in turn supported by one or more longitudinal carriages such that the first member is capable of being driven by a first motor to move the first member in the direction longitudinal to the depth of the pallet, and wherein the second member of the fastening assembly is supported and moveable in a second transverse carriage that is in turn supported by the one or more longitudinal carriages such that the second member is capable of being driven by a second motor to move the second member in the direction longitudinal to the depth of the pallet, the method comprising activating the first and second motors to cause the first and second motors to move along the one or more longitudinal carriages in relation to one another to fasten the first load between the first and second members.

8. The method according to claim 1, wherein prior to or at the time of transferring the load to the second surface, the step of fastening the load between first and second members of a fastening assembly is accomplished by moving each of the first and second members with respect to one another in the direction longitudinal to the depth of the pallet.

9. The method according to claim 1, wherein each of the first and second members of the fastening assembly respectively comprises first and second contact surfaces between which the first load is fastened prior to or at the time of transferring the first load to the second surface, the method further comprising stabilizing the first load against a third contact surface while the first load is fastened between the first and second contact surfaces prior to transferring the load to the second surface, the third contact surface being arranged substantially orthogonal to the first and second contact surfaces.

* * * * *